Figure 1:
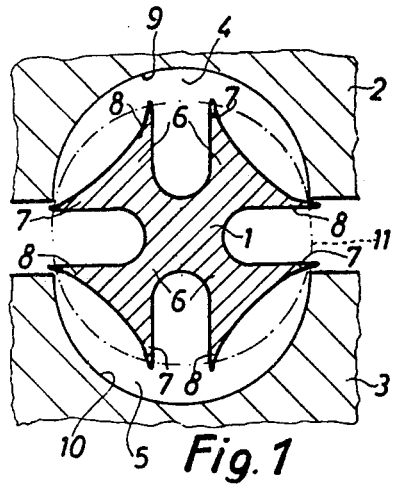

United States Patent
Fischer

[15] 3,682,489
[45] Aug. 8, 1972

[54] CENTERING LABYRINTH SEAL

[72] Inventor: Hans Fischer, Urbanstrasse 54, D 85 Nurnberg, Germany

[22] Filed: July 28, 1970

[21] Appl. No.: 58,933

[30] Foreign Application Priority Data

Aug. 1, 1969   Germany..........P 19 39 195.8

[52] U.S. Cl. ..................277/53, 277/169, 277/171, 277/236
[51] Int. Cl. ..........................F16j 15/48, F16l 19/00
[58] Field of Search.....277/171, 206.1, 169, 236, 53, 277/209, 168, 211

[56] References Cited

UNITED STATES PATENTS 2,898,000   8/1959   Hanny ..................277/236 X

FOREIGN PATENTS OR APPLICATIONS 1,279,545   11/1961   France......................277/180

*Primary Examiner*—Samuel B. Rothberg
*Attorney*—Walter Becker

[57] ABSTRACT

A centering labyrinth seal for detachably connecting two parts such as cylinder and cylinder head with annular grooves in the surfaces along which the two parts are to be interconnected, said seal including an annular core member having connected thereto radially arranged annular webs with elastically or plastically and elastically deformable sealing lips adapted to engage wall portions of said grooves and to follow axial and radial deformations thereof.

8 Claims, 7 Drawing Figures

INVENTOR
Hans Fischer

CENTERING LABYRINTH SEAL

The present invention relates to a centering labyrinth seal for detachably connecting cylindrical pipes or pipes with closing covers, especially cylinders and cylinder heads of piston-prime movers, for varying pressure and temperature of gaseous media.

German Patent No. 1,180,999 discloses a cylinder head seal for reciprocable piston internal combustion engines which is provided with labyrinths. Such labyrinth seal consists of a sealing ring of Y-shaped or double Y-shaped cross-section which is adapted to be inserted into an annular groove of the cylinder and which is spread between the bottom of the groove and the bottom side of the cylinder head and has one or two arms which point toward the pressure chamber and by a preload or by the pressure in the cylinder are pressed against the sealing surfaces. The arms have a continuous even wall thickness and wide rounded non-deformable ends which merely engage the sealing surface but do not adapt to any unevenness of the sealing surfaces. Therefore, a precise machining of the sealing surfaces is imperative. Inasmuch as the sealing surface on the cylinder head side is located in the same plane as the supporting surface of the cylinder head, the sealing rings have the tendency, in view of pressure and temperature variations, easily to blow, particular inasmuch as together with the bottom side of the cylinder head they form only one labyrinth chamber. Sealing arrangements of this type, therefore, are not suitable for high and variable pressures and temperatures. Furthermore, a centering of the parts to be interconnected is lacking.

German Patent 832,520 describes a cylinder head seal for high pressures and temperatures which is of a substantially rectangular cross-section and is likewise insertable into an annular groove of the cylinder. At that surface which faces the cylinder head, the sealing ring has two or more sharp sealing edges which are directed perpendicularly toward the bottom side of the cylinder head and by means of which labyrinth chambers are formed. That surface which faces the cylinder or the bottom of the groove has a substantially plane engagement with or is pressed by means of a sharp edge into the bottom of the groove. In this instance no labyrinth chambers are provided nor can they be provided in view of the small engaging surface. Moreover, the sealing ring requires considerable width and in view of the perpendicular sealing edges requires a high pressure to be exerted upon the parts to be interconnected. When disengaging the connection, in view of the sealing edges pressed into the groove bottom, a post-machining of the annular grooves becomes necessary. A simultaneous centering of the parts to be interconnected is likewise lacking.

It is, therefore, an object of the present invention to provide a detachable labyrinth seal for high and variable pressures and temperatures of gaseous media which will simultaneously bring about a centering of the two parts to be interconnected and with a surface as small as possible will permit the provision of as great a number of labyrinth chambers as possible without requiring an increase in the pressure to be exerted upon the two parts to be connected to each other.

It is another object of this invention to provide a labyrinth seal as set forth in the preceding paragraph, which will adapt itself to the minor unevenness of the sealing surfaces.

Figure 3:
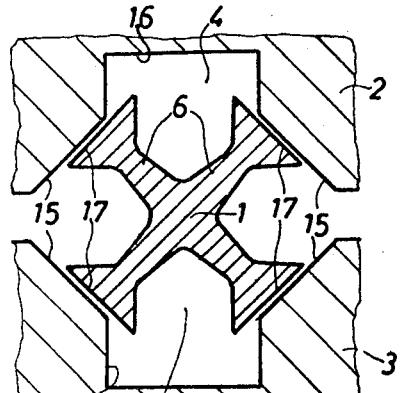
Figure 5:
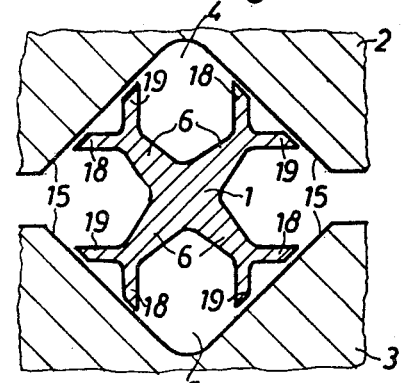

These and other objects and advantages of the invention will appear more clearly from the following specification in connection with the accompanying drawings, in which:

FIGS. 1, 3 and 5 respectively illustrate on an enlarged scale different cross-sectional shapes of the sealing ring according to the invention and different annular grooves.

Figure 2:
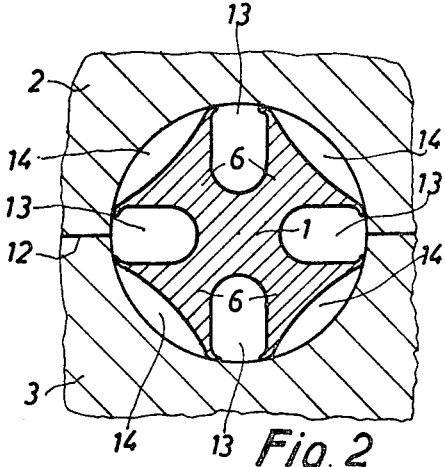
Figure 4:
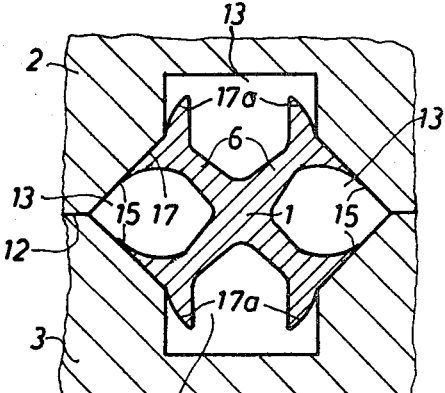
Figure 6:
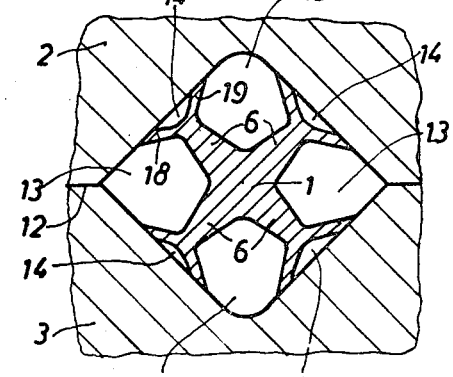

FIGS. 2, 4 and 6 respectively illustrate the sealing rings of FIGS. 1, 3 and 5 in installed condition.

Figure 7:
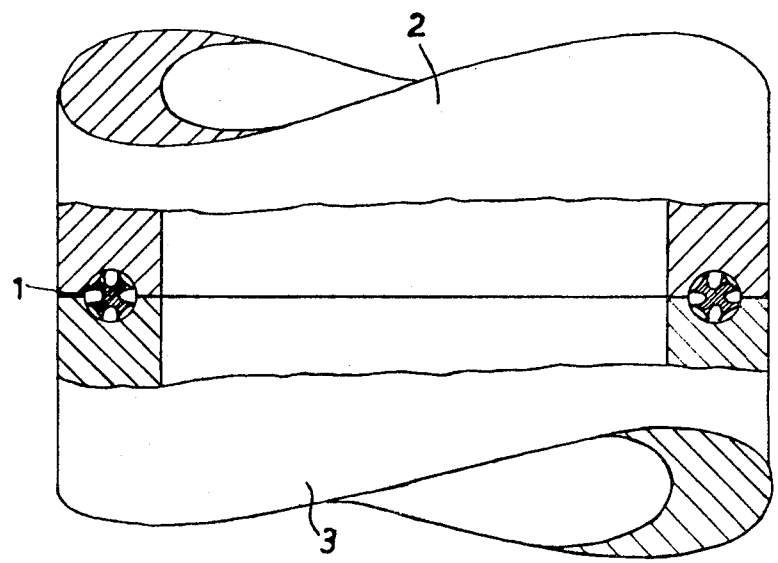

FIG. 7 shows by way of example a seal according to the invention for sealing two interconnected pipe sections.

The labyrinth seal according to the present invention is characterized primarily in that a profiled sealing ring at the joint of the parts to be connected is insertable partly into one part and partly into the other part of the two parts to be interconnected, and is furthermore characterized in that the profile of the sealing ring is such that at its circumference labyrinth chambers are formed by radial webs starting from its center, which webs at the engaging surfaces of the annular grooves form sealing lips and elastically or plastically and elastically follow axial and radial deformations of the two parts as they may be caused by pressure and temperature variations.

The annular grooves in the parts to be interconnected may have different cross-sectional shapes. The cross-sectional shape of a semicircle or a rectangular triangle the hypotenuse of which coincides with the plane of the joint is preferred.

According to a further development of the invention, each of the webs is provided with two sealing lips extending in opposite direction with regard to each other and at an acute angle extending toward the engaging surfaces of the annular grooves whereby between said sealing lips a further labyrinth chamber is formed.

In view of the elastic webs and sealing lips, also any possible minor lateral offsetting of the annular grooves with regard to each other is compensated for while a centering is nevertheless effected. Similarly, a slight spring of the two parts to be interconnected will be compensated for.

Referring now to the drawings in detail, FIGS. 1 and 2 show a sealing ring 1 and two parts 2 and 3 to be connected to each other. The parts 2 and 3 each are provided with semicircular annular grooves 4 and 5 of the same diameter. The sealing ring 1 has four webs 6 which extend from the center of the sealing ring radially outwardly. Each of said webs 6 is provided with two slender and elastic sealing lips 7, 8 which extend in opposite direction with regard to each other and which form an acute angle with regard to the engaging surfaces 9 and 10 in the annular grooves 4 and 5. When being produced, the sealing lips 7, 8 extend beyond the diameter defined by the annular grooves 4, 5, said diameter being indicated in FIG. 1 by dot-dash circle 11.

As will be seen from FIG. 2, when assembling the two parts 2, 3 to be interconnected, the protruding elastic sealing lips 7, 8 are in view of the lateral engagement pressed away laterally and snugly engage the surfaces 9, 10. Any lateral offsetting of the two annular grooves 4, 5 is compensated for by the elastic webs 6 which adapt themselves to the respective annular groove 4, 5. The plane along which both parts 2 and 3 engage each other is indicated as joint 12.

In view of the described design of the sealing ring 1, it will be appreciated that in assembled condition between the webs 6 there will be formed four labyrinth chambers 13 while between the sealing lips 7, 8 additional four labyrinth chambers 14 are formed which are distributed uniformly over the circumference so that each, on the side of part 2 as well as on the side of part 3, five serially arranged labyrinth chambers 13, 14 are provided which are available for sealing the joint 12.

FIGS. 3 and 4 illustrate a further embodiment of a sealing ring 1 according to the invention. Those parts which correspond to the parts referred to above in connection with FIGS. 1 and 2 have been designated with the same reference numerals but with the additional character b. The annular grooves in parts 2b and 3b are in this instance provided with engaging surfaces 15 which are inclined at an angle of 45° with regard to the joint 12b. The engaging surfaces 15 are at the core of the annular groove interrupted by a depression 16. The sealing lips 17 provided on the webs 6b are designed as continuous plane surfaces and are parallel to the engaging surfaces 15.

When assembling the parts 2b and 3b, as will be evident from FIG. 4, the sealing lips 17 are only partly deformed by the engaging surfaces 15, whereas the remaining parts 17a extend in a nearly non-deformed shape into the depressions 16 and form diagonally extending sealing surfaces. As a result thereof, during an elastic spring of the two parts 2b and 3b, at least one sealing surface will each time become effective. With this design, on each side of the joint, only three labyrinth chambers 13b each are formed.

FIGS. 5 and 6 show a modification of the sealing ring 1b of FIGS. 3 and 4 which is insertable in triangular annular grooves 4c and 5c of the parts 2c and 3c. The engaging surfaces 15c are likewise at an angle of 45° inclined toward the joint 12c but are not interrupted. The webs 6c are each provided with two sealing lips 18, 19 which form an acute angle with regard to their engaging surfaces 15c so that during the assembly, in conformity with FIG. 6, similar to FIG. 2 four labyrinth chambers 13c and 14c each are formed.

FIG. 7 shows the members 2, 3 to be interconnected in the form of two pipes having a sealing ring of the type shown in FIGS. 1 and 2 interposed between adjacent end faces of said pipes.

It is, of course, to be understood that the present invention is, by no means, limited to the particular constructions shown in the drawing, but also comprises any modifications within the scope of the appended claims.

What I claim is:

1. In combination with two parts to be sealingly interconnected, especially cylinder and cylinder head, and respectively provided with annular groove means arranged in the surfaces along which said two parts are to be sealingly connected to each other, said groove means being in substantial alignment with each other, a profiled sealing ring comprising an annular core and a plurality of annular webs extending radially outwardly from said core respectively into the groove means of said two parts and continuously tending to hold said groove means in one part in alignment with the groove means in the other part to thereby center said two parts with regard to each other, the outer ends of said webs forming sealing lips sealingly engaging portions of the walls which define said groove means and being elastic so as to follow axial and radial deformations of said two parts as caused by pressure and temperature variations, the outer end of each of said webs being provided with two sealing lips extending in opposite directions with regard to each other and the sides of each of said sealing lips defining with each other an acute angle.

2. A combination according to claim 1, in which said sealing lips engage said wall portions plastically and elastically.

3. A combination according to claim 1, in which said groove means in each of said parts includes oppositely inclined surfaces tapering in the direction toward the bottom surface of the respective groove means and sealingly engaging the respective adjacent sealing lips.

4. A combination according to claim 3, in which said inclined surfaces form an angle of about 45° with the respective adjacent surface portion in which said groove means is provided.

5. A combination according to claim 3, in which the inclined surfaces of said groove means in each of said parts are separated from each other by an annular groove.

6. In combination with two parts to be sealingly interconnected, especially cylinder and cylinder head, and respectively provided with annular groove means arranged in the surfaces along which said two parts are to be sealingly connected to each other, said groove means being in substantial alignment with each other, a profiled sealing ring comprising an annular core and a plurality of annular webs extending radially outwardly from said core respectively into the groove means of said two parts and continuously tending to hold said groove means in one part in alignment with the groove means in the other part to thereby center said two parts with regard to each other, the outer ends of said webs forming sealing lips sealingly engaging portions of the walls which define said groove means and being elastic so as to follow axial and radial deformations of said two parts as caused by pressure and temperature variations, the outer end of each of said webs being provided with two sealing lips extending in opposite directions with regard to each other, the sides of each of said sealing lips defining with each other an acute angle, each two adjacent lips respectively pertaining to two adjacent webs defining with the latter a labyrinth.

7. A combination according to claim 3, in which at least a portion of the radially outermost surfaces of said sealing lips is substantially parallel to said inclined surfaces and substantially perpendicular to the axes of the pertaining webs.

8. A combination according to claim 7, in which only a portion of the radially outermost surfaces of said sealing means engages said inclined surfaces while another portion of said radially outermost surfaces extends in nearly undistorted manner in spaced relationship to the walls of the respective adjacent groove means.

* * * * *

UNITED STATES PATENT OFFICE
CERTIFICATE OF CORRECTION

Patent No. 3,682,489                    Dated August 8, 1972

Inventor(s) Hans Fischer

It is certified that error appears in the above-identified patent and that said Letters Patent are hereby corrected as shown below:

On the cover sheet insert -- [73] Assignee

Maschinenfabrik Augsburg-Nurnberg Aktiengesellschaft --.

Signed and sealed this 19th day of December 1972.

(SEAL)
Attest:

EDWARD M. FLETCHER, JR.                ROBERT GOTTSCHALK
Attesting Officer                       Commissioner of Patents